United States Patent [19]

Rylander

[11] 4,398,727
[45] Aug. 16, 1983

[54] PRESSURE BALANCING STUFFING GLAND FOR SHAFTS

[76] Inventor: Nicholas M. Rylander, 228 W. 17th Pl., Tulsa, Okla. 74119

[21] Appl. No.: 429,051

[22] Filed: Sep. 30, 1982

[51] Int. Cl.³ .................. F16J 15/46; F16C 19/10; F16C 39/04
[52] U.S. Cl. .................................... 277/3; 277/73; 277/27; 384/100
[58] Field of Search ............... 277/3, 12, 73, 27; 384/100, 102, 121, 105, 123, 126

[56] References Cited

U.S. PATENT DOCUMENTS

| | | | |
|---|---|---|---|
| 1,122,051 | 12/1914 | Wohlenberg | 384/121 X |
| 1,903,210 | 3/1933 | Carrier | 384/105 X |
| 2,605,147 | 7/1952 | Raichle et al. | 384/123 |
| 3,122,373 | 2/1964 | Lee et al. | 277/73 X |
| 3,854,781 | 12/1974 | Bildtsen | 384/126 X |
| 3,913,989 | 10/1975 | Williams | 384/123 |
| 4,240,675 | 12/1980 | Rylander | 384/100 |

FOREIGN PATENT DOCUMENTS 1061274 7/1959 Fed. Rep. of Germany ........ 277/73

Primary Examiner—Robert S. Ward, Jr.
Attorney, Agent, or Firm—Mildred K. Flowers

[57] ABSTRACT

A stuffing gland for shafts subject to relatively high pressures acting thereon in one longitudinal direction and comprising a flange disposed around the outer periphery of the shaft and having one side thereof open to the high pressure acting on the shaft, the flange being connected with the shaft for transmitting the force created by the pressure acting thereon to the shaft in a longitudinal direction opposed to the action of the high pressure surrounding the shaft, the area of the flange open to the high pressure being equal to the cross sectional area of the shaft for balancing the forces acting of the shaft for ease of operation of the shaft.

6 Claims, 6 Drawing Figures

PRESSURE BALANCING STUFFING GLAND FOR SHAFTS

BACKGROUND OF THE INVENTION

1. Field of the Invention

This invention relates to improvements in stuffing glands and more particularly, but not by way of limitation, to a pressure balancing stuffing gland for shafts subjected to relatively high pressures.

2. Description of the Prior Art

In any pressure vessel having a shaft or stem protruding therefrom through a single opening, such as a gate valve stem, or the like, the shaft is urged axially outwardly from the vessel by a force in pounds equal to the projected area of the largest sealed diameter of the shaft (expressed in square inches) multiplied by the internal pressure in pounds per square inch, commonly known as psi. The pressure thus acting on the shaft causes difficulties in operation of the shaft, particularly when the internal pressure in the vessel or valve is relatively high. The force urging the shaft axially outwardly must be overcome in some manner in order to activate the shaft, such as to rotate the shaft about its longitudinal axis, as in order to open or close a gate valve. For example, a one inch diameter shaft extending or protruding from a vessel having an internal pressure of one thousand psi is urged outwardly by a force of seven hundred eighty pounds. A two inch diameter shaft subjected to the same pressure conditions is pushed by a force equal to 3,142 pounds. It will be readily apparent that powerful operators and/or high quality bearings must be utilized for overcoming these forces in order to actuate the shaft. The stuffing gland disclosed in my prior U.S. Pat. No. 4,240,675 is arranged for equalizing the pressures acting on the shaft for greatly reducing the force required for actuation of the shaft. The particular design of the shaft in my aforesaid patent requires a considerable amount of machining in the case of a long shaft, which is not only an expensive operation, but also results in considerable waste of material.

SUMMARY OF THE INVENTION

The present invention contemplates a novel stuffing gland for balancing the forces acting on a shaft and particularly designed and constructed for overcoming the foregoing disadvantages. The novel stuffing gland comprises collar means adapted to be disposed around the outer periphery of the shaft and having an outer face of an area substantially equal to the cross sectional area of the shaft. The outer face of the collar is open to the internal pressure of the valve, vessel, or the like, with which the shaft is utilized, and since the two areas open to the pressure are equal, it will be readily apparent that the forces acting on the shaft are balanced, thus reducing the force required for actuation of the shaft. The novel stuffing gland is simple and efficient in operation and economical and durable in construction.

BRIEF DESCRIPTION OF THE DRAWINGS

FIG. 1 is a sectional elevational view of a stuffing gland embodying the invention and illustrated in position around the protruding end of a shaft associated with a pressure vessel, valve, or the like.

DETAILED DESCRIPTION OF THE PREFERRED EMBODIMENTS

Figure 2:
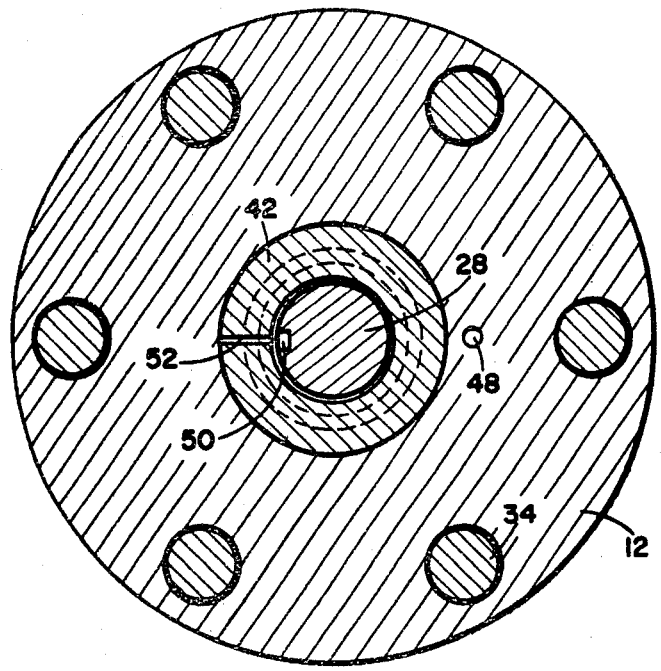
FIG. 2 is a view taken on line 2—2 of FIG. 1.
Figure 1:
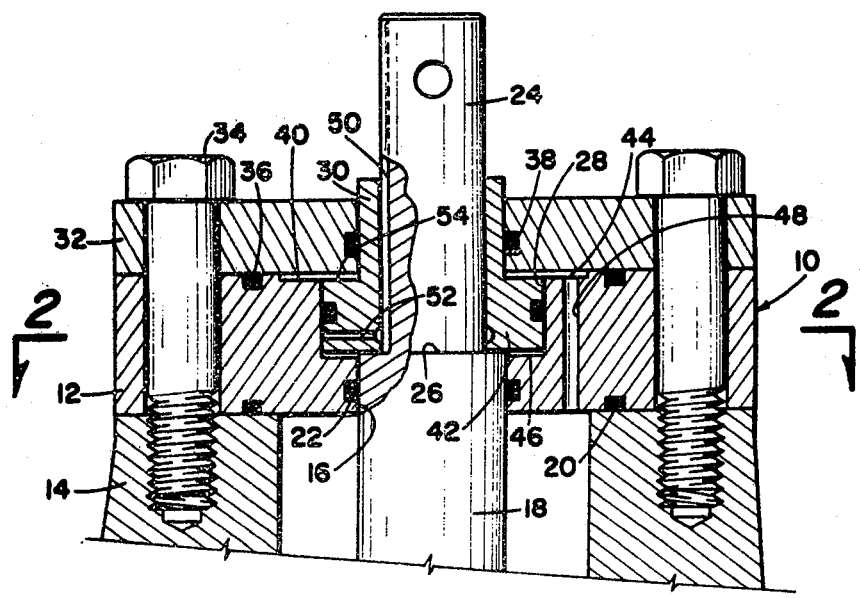

Referring to the drawings in detail, and particularly FIGS. 1 and 2, reference character 10 generally indicates a stuffing gland comprising a plate member 12 adapted to be secured to the body 14 of a valve, vessel, or the like. The plate 12 is provided with a central bore 16 extending therethrough for receiving the outer end of the shaft 18 therein. Of course, suitable sealing means, such as an O-ring 20 may be interposed between the plate 12 and the body 14 for precluding leakage of fluid therebetween, and similar sealing means 22 may be interposed between the outer periphery of the shaft 18 and the bore 16 for precluding leakage of fluid therebetween.

The shaft 18 is preferably of a reduced diameter as shown at 24, providing an annular shoulder 26 around the outer periphery thereof. The bore 16 is enlarged at 28 in the proximity of the reduced portion 24 of the shaft 18, and a flanged collar 30 is loosely disposed in the enlarged portion 28 in engagement with the annular shoulder 26. An outer plate 32 is secured to the outer face of the plate 12 for securing the flanged collar 30 within the enlarged bore portion 28, and it is preferable that the plates 12 and 32 be secured together and to the body 14 by suitable bolts 34, or the like. Of course, suitable sealing means 36 may be interposed between the plates 12 and 32 for precluding leakage of fluid therebetween, and similar sealing means 38 may be interposed between the plate 32 and the flanged collar 30 for precluding leakage of fluid therebetween.

The outer face of the plate 12 is provided with a centrally disposed recess 40 conterminous with the enlarged bore portion 28, and the overall width of the head 42 of the collar 30 is slightly less than the distance between the bottom of the enlarged bore portion 28 and the inner face of the plate 32, as particularly shown in FIG. 1. This provides a chamber 44 at the outer end of the head 42 and a chamber 46 at the inner end of the head 42 for a purpose as will be hereinafter set forth. A longitudinally extending bore or passageway 48 is provided in the plate 12 providing communication between the chamber 44 and the interior of the body 14 whereby the pressure within the body 14 is equal to the pressure in the chamber 44. A longitudinally extending recess or passageway 50 is provided along the outer periphery of the reduced neck portion 24 of the shaft 28, and a radially extending passageway 52 is provided in the head member 42 to establish communication between the exterior of the head 42 and the passageway 50 whereby any pressure present in the chamber 46 may be vented to the exterior of the stuffing gland 12.

The flanged collar 30 is particularly designed in such a manner that the area of the annular face 54 of the head 42 which is open or exposed to the chamber 44 is equal to the cross sectional area of the shaft 18. As hereinbefore set forth, the pressure present within the chamber 44 is equal to the internal pressure of the body 14, and thus the pressure acting against the shoulder or face 54 is equal to the pressure acting in an opposite direction on the shaft 18. Thus, the forces acting on the shaft are balanced, and the shaft may be readily actuated as required during the use or operation of the valve or vessel in association therewith.

Figure 4:
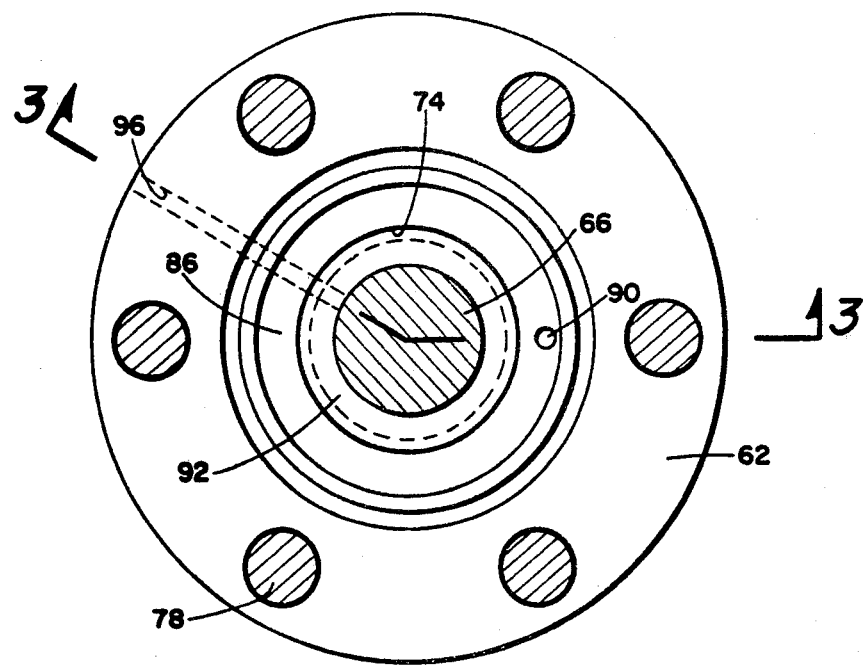
FIG. 4 is a view taken on line 4—4 of FIG. 3.
Figure 3:
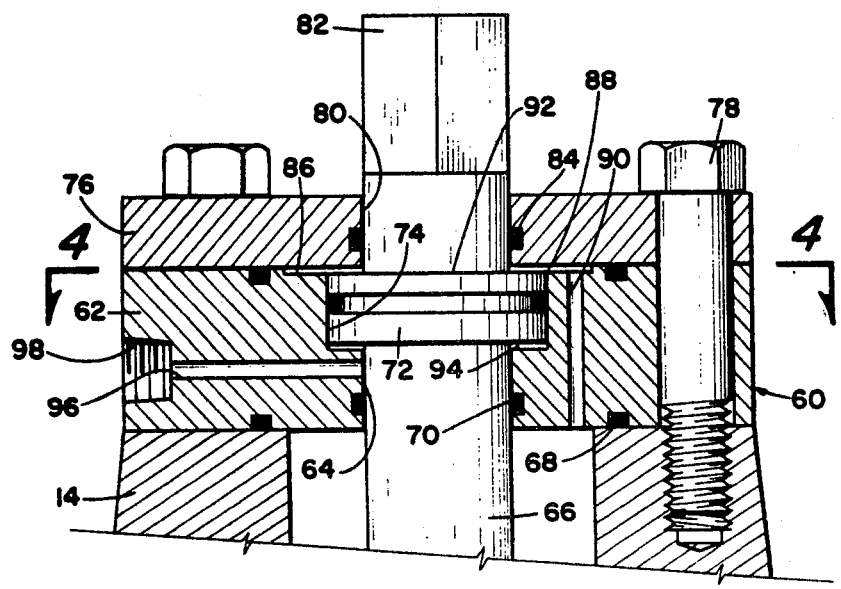
FIG. 3 is a sectional elevational view of a modified stuffing gland embodying the invention and is taken on line 3—3 of FIG. 4.

Referring now to FIGS. 3 and 4, reference character 60 generally indicates a modified stuffing gland comprising a plate 62 secured to the body 14 and having a central bore 64 provided therein for receiving a shaft 66 therethrough. Of course, suitable sealing means 68 is preferably interposed between the body 14 and the plate 62 for precluding leakage of fluid therebetween, and similar sealing means 70 may be interposed between the bore 64 and the outer periphery of the shaft 66 for precluding leakage of fluid therebetween. An outwardly extending circumferential flange 72 is provided on the outer periphery of the shaft 66, and the bore 64 is enlarged at 74 for receiving the flange 72 therein. Whereas it is a disadvantage to machine a relatively long shaft in a manner for providing the flange 72, it is to be noted that in the case of a relatively short shaft 66, the machining operation and material loss is relatively immaterial in the overall cost of the entire vessel, valve, or the like. Of course, it is preferable to provide a suitable sealing means 76 between the flange 72 and bore portion 74.

A second plate 76 is disposed against the outer face of the plate 62 and is secured thereto and to the body 14 in any suitable manner, such as by a plurality of bolts 78, as is well known. The plate 76 is provided with a central bore 80 for receiving the outer end 82 of the shaft 66 therethrough and any suitable operator means (not shown) may be secured to said outer end 82 for actuation of the shaft 66 in the usual or well known manner.

The plate 62 is provided with an annular recess 86 of the outer face thereof to provide a chamber 88 between the plates 62 and 76. A passageway or bore 90 extends longitudinally through the plate 62 to provide communication between the chamber 88 and the interior of the body 14. Thus, the pressure present in the chamber 88 is always equal to the internal pressure of the body 14. The area of the outer face 92 of the flange 72 is equal to the cross sectional area of the shaft 66, and since the face 92 is exposed to the pressure in the chamber 88, it will be readily apparent that the pressure acting on the shaft from both longitudinal directions is equal, thus balancing the forces acting on the shaft and reducing the force necessary for activation of the shaft. Of course, it may be preferably to provide a chamber 94 between the bottom of the enlarged bore portion 74 and the annular flange 72, and a radially extending passageway or bore 96 extending through the plate 62 into communication therewith. The passageway 96 provides communication between the chamber 94 and the exterior of the plate 62, and, if desired, may be provided with a threaded portion 98 at the outer end thereof for receiving a suitable lubrication fitting, or the like, (not shown).

Figure 6:
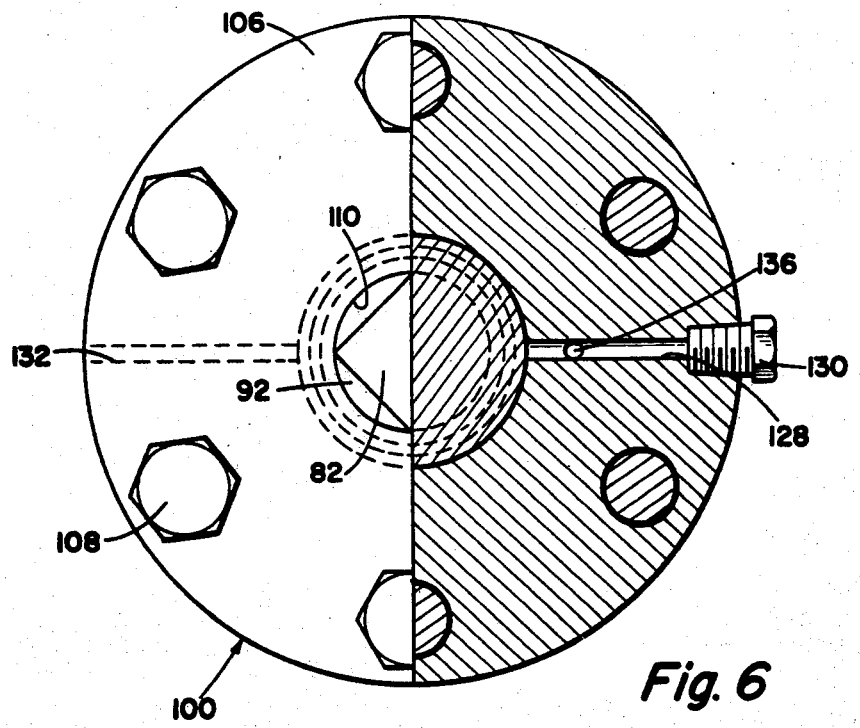
FIG. 6 is a view taken on line 6—6 of FIG. 5.
Figure 5:
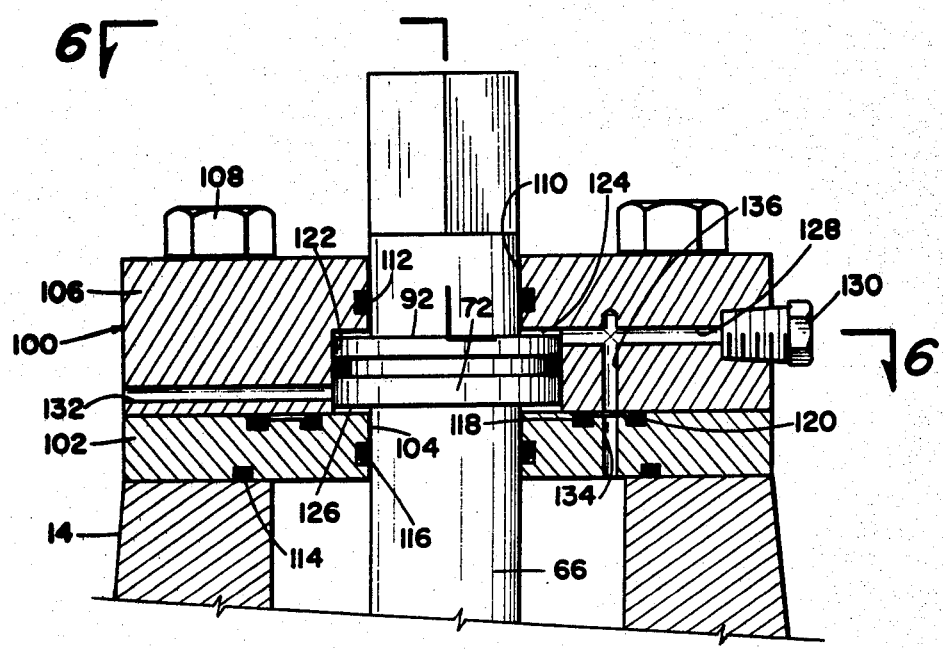
FIG. 5 is a sectional elevational view of another modified stuffing gland embodying the invention.

Referring now to FIGS. 5 and 6, reference numeral 100 generally indicates a stuffing gland similar to the stuffing gland 60 for connection with the body 14 and adapted to be disposed around the shaft 66 thereof. The stuffing glane 100 comprises a first plate member 102 disposed against the body 14 and having a centrl bore 104 for receiving the shaft 66 therethrough. A second plate 106 is disposed against the outer face of the plate 102 and is secured to the plate 102 and body 14 in any suitable manner, such as by a plurality of bolts 108. The plate 108 is provided with a central bore 110 for receiving the outer end 82 of the shaft 66 therethrough. Of course, suitable sealing means 112 may be interposed between the bore 110 and the shaft 66, as well as between the plate 102 and body 14 as shown at 114. It is also desirable to provide sealing means 116 between the outer periphery of the shaft 66 and the bore 104, and sealing means 118 and 120 concentrically arranged between the plates 102 and 106.

The bore 110 of the plate 106 is enlarged at 122 for receiving the flange 72 therein, and is preferably of a depth greater than the length of the flange 72 for providing chambers 124 and 126 at the opposite ends of the flange. A first radially extending bore or passageway 128 is provided in the body or plate 106 to provide communication between the chamber 124 and the exterior of the plate 106, and if desired, a suitable lubricating fitting 130 may be threadedly secured at the outer end of the bore 128. A second radially extending bore or passageway 132 is provided in the plate 106 to provide communication between the chamber 126 and the exterior of the plate 106 for exhausting fluid pressure therefrom, as is well known.

As hereinbefore set forth, the area of the outer face 74 of the flange 92 is equal to the cross sectional area of the shaft 66. Thus, a pair of aligned longitudinal passageways or bores 134 and 136 are provided in the plates 102 and 106 to provide communication between the interior of the body 14 and the passageway 128, and ultimately to the chamber 124 whereby the pressure in the chamber 124 will be equal to the pressure within the body 14, thus providing a balancing of the forces acting in both longitudinal directions on the shaft 66, and reducing the force required for actuation of the shaft.

From the foregoing it will be apparent that the present intention provides a novel stuffing gland for use with the projecting end of a shaft utilized in a high pressure vessel, valve, or the like, and which is particularly designed for equalizing the pressures acting on the shaft for facilitating actuation of the shaft. The stuffing gland comprises a collar member having one end open to the high pressure of the interior of the vessel or valve, and secured to or integral with the shaft whereby the forces acting on the outer face of the collar is directed to the shaft for counteracting the forces applied in the opposite direction on the shaft in order to balance the forces and allievating the activating power required for actuation of the shaft.

Whereas the present invention has been described in particular relation to the drawings attached hereto, it should be understood that other and further modifications, apart from those shown or suggested herein may be made within the spirit and scope of this invention.

What is claimed is:

1. A stuffing gland for a shaft subjected to relatively high pressures and comprising first plate means secured around the outer periphery of the shaft and having a central bore provided therein surrounding the shaft, outwardly extending circumferential flange means provided around the outer periphery of the shaft and disposed in the central bore, second plate means secured adjacent the outer surface of the first plate means for retaining the flange means in said central bore, pressure chamber means provided between the second plate means and one side of said flange means, means provided for relieving pressure at the opposite side of said flange means, passageway means extending through the first plate means for communication said relatively high pressures to the pressure chamber means, and the area of the flange means exposed to the pressure in the pressure chamber means being equal to the cross sectional area of the shaft for balancing the forces acting on the shaft.

2. A stuffing gland as set forth in claim 1 wherein the flange means comprises a flanged collar member disposed around the outer periphery of the shaft and in the central bore, the flanged collar member having a head member with one side thereof open to the pressure chamber, the area of the head member open to the pressure chamber being equal to the cross sectional area of the shaft for providing the balancing of the forces acting on the shaft.

3. A stuffing gland as set forth in claim 1 wherein the flange means comprises an outwardly extending annular shoulder provided around the outer periphery of the collar, one side of the shoulder being open to the pressure chamber, the area of said one side of the shoulder being equal to the cross sectional area of the shaft for providing the balancing of the forces acting on the shaft.

4. A stuffing gland as set forth in claim 1 and including means for supplying lubricant to the shaft portion disposed within the flange means for facilitating operation of the shaft.

5. A stuffing gland as set forth in claim 1 wherein the pressure relieving means includes longitudinally extending passageway means provided on the outer periphery of the shaft, and radially extending bore means provided in the flange means providing communication between the longitudinal passageway means and the said opposite side of the flange means for relieving the pressure to the atmosphere.

6. A stuffing gland as set forth in claim 1 wherein the pressure relieving means includes radially extending passageway means provided in said first plate means providing communication between the said opposite side of the flange means and the atmosphere for discharging the pressure therethrough.

* * * * *